7.1581

N. Chappell's

"Cultivator Tooth."

PATENTED
DEC 3 1867

Witnesses
Jno. S. Loughborough
A. H. Billings

Inventor
N. Chappell

United States Patent Office.

NORMAN CHAPPELL, OF LIMA, NEW YORK, ASSIGNOR TO HENRY E. CHAPPELL, OF SAME PLACE.

Letters Patent No. 71,581, dated December 3, 1867.

IMPROVEMENT IN CULTIVATOR-TEETH.

The Schedule referred to in these Letters Patent and making part of the same.

TO ALL WHOM IT MAY CONCERN:

Be it known that I, NORMAN CHAPPELL, of Lima, in the county of Livingston, and State of New York, have invented a new and useful "Cultivator-Tooth;" and I do hereby declare that the following is a full, clear, and exact description thereof, reference being had to the accompanying drawings, making part of this specification, in which—

Like letters indicate corresponding parts.

This invention consists in constructing cultivator-teeth with horizontal wings or blades, to which is attached, by suitable links, a metal plate, and to the rear edge of that several separators, which are composed of a number of radial fingers, joined at their front end.

To enable others to make and use my invention, I will describe its construction and operation.

Figure 1:
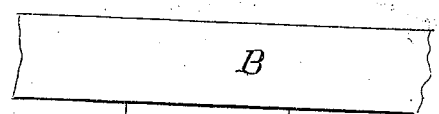
Figure 1 is a side elevation of my invention, showing a section of one of the cultivator-beams to which the teeth are attached.
Figure 2:
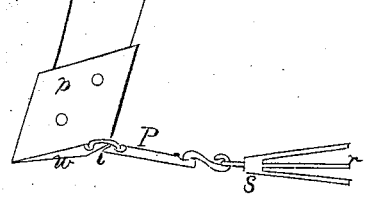
Figure 2 is a top view or plan of the wings of the teeth with the hinged apron and separators.
Figure 2:
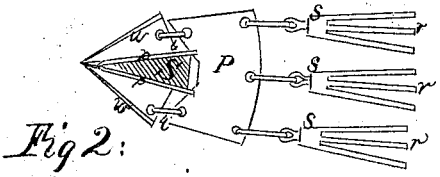

I provide suitable shanks S, which are attached to the beams B of the cultivator-frame in the usual manner. A transverse section of the shank is shown in fig. 2. The points or teeth proper are composed of two plates, $p$, having projecting shares or wings, $w$. They are attached to the shank by means of rivets or screw-bolts. There is sufficient pitch given to the shares to cause them to enter the earth. To the rear edge of the shares $w$ is attached a plate, P, extending laterally the full width of the two shares. It is attached loosely by links $i$, so as to be free to vibrate vertically. I attach several separators $s$ to the rear edge of this plate. They are composed of several small metallic rods $r$, similar to the separators shown in my "bean-harvester," patented February 7, 1865. The teeth are so arranged in the cultivator-frame as to cause the shares $w$ to cut under the entire surface. The machine can be set in the ordinary way to cut any desired depth. It will be seen that the grass and weeds are thus cut off below the surface, and as the plates $p$ and the separators $s$ pass under them, they are entirely separated from the earth and worked up and left upon the surface to die. The separators have a constant rotating vibratory motion as they are drawn through the ground. It will be seen that the front edges of the plates $p$ are so joined as to constitute a coulter of wedge-shape. The separators $s$ may be connected to the plate $p$ by a single link, as shown, or short chains may be used. The shares and separators may be used without the plate P, if desired.

What I claim as my invention, and desire to secure by Letters Patent, is—

1. The arrangement in cultivator-teeth of the plate P and shares $w$, substantially in the manner and for the purposes herein shown and described.

2. The combination of the shares $w$ and separators $s$, substantially in the manner herein described and for the purposes set forth.

N. CHAPPELL.

Witnesses:
WM. S. LOUGHBOROUGH,
A. H. BILLINGS.